United States Patent Office 3,594,314
Patented July 20, 1971

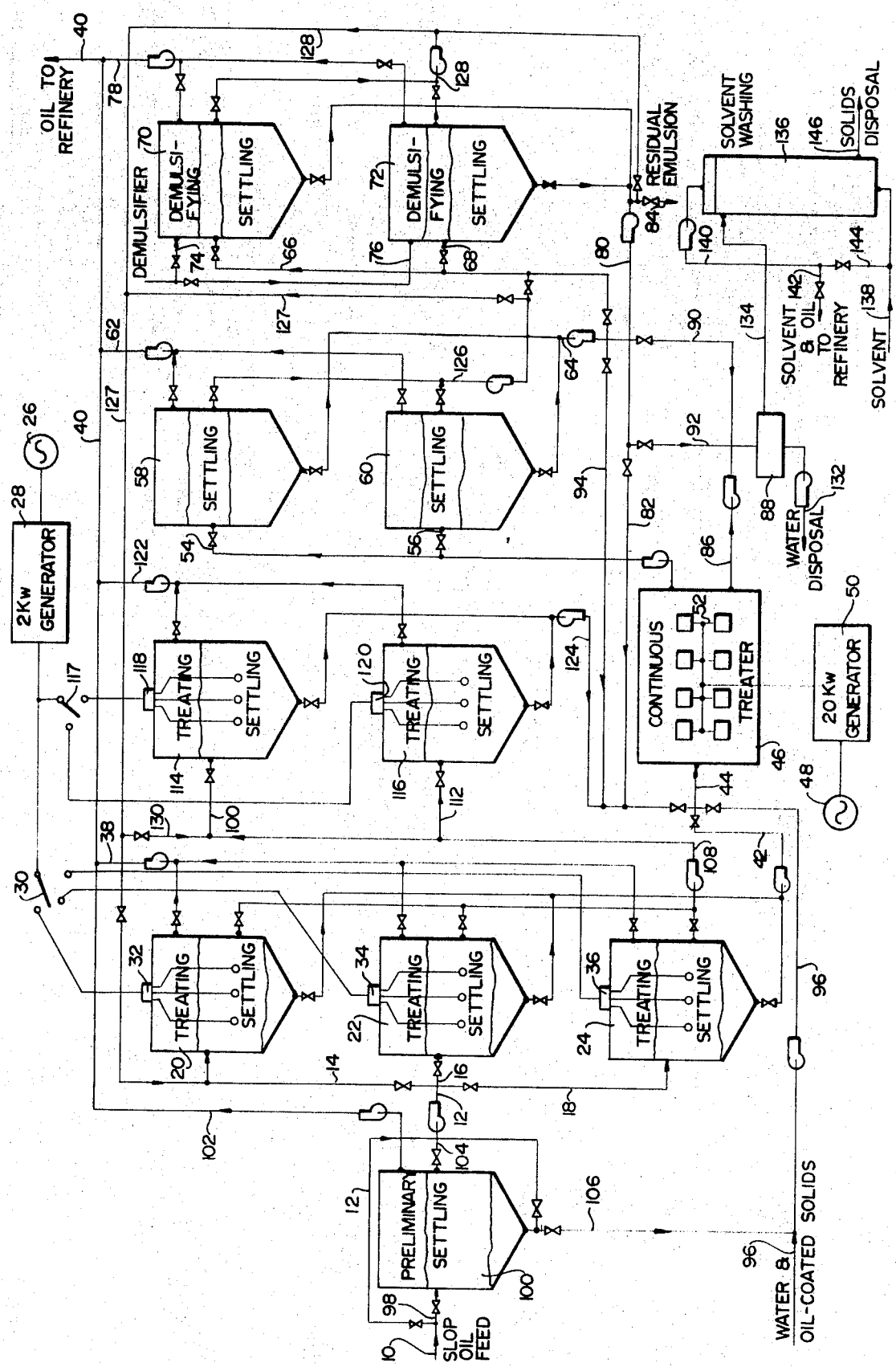

---

3,594,314
METHOD OF SEPARATING OIL, WATER AND SOLIDS BY ULTRASONIC TREATMENT
James R. Bilhartz, 3220 Cliffoak Drive, Dallas, Tex. 75233, and Alden G. Nellis, Jr., 1709 Winthrop, Irving, Tex. 75060
Filed Feb. 12, 1969, Ser. No. 798,664
Int. Cl. B01d *17/04*
U.S. Cl. 210—19                     28 Claims

ABSTRACT OF THE DISCLOSURE

A method for treating waste materials containing oil, water, oil and water emulsions, and oil-coated solids, particularly slop oil from an integrated petroleum refinery, to separate oil, water and solids which can be utilized or disposed of without environmental contamination, in which the waste material is subjected to ultrasonic treatment at subcavitation power levels and permitted to settle, for example at a power level of about 2 to 10 watts per barrel of oil and with hourly alternate treatment for 5 to 30 minutes and settling for 30 to 55 minute periods for an 8-hour treating cycle, followed by a 16-hour settling period, to provide a 24-hour total time cycle; a clarified oil phase is recovered as an upper phase; a lower phase is removed and subjected to ultrasonic treatment at cavitation power levels, for example in a continuous flow operation and at a power level of about 1 to 10 kilowatt hours per barrel of fluid treated; the cavitated product is then separated to recover an upper free oil phase and a lower water and solids phase; and the water and solids are then separated for use and/or disposal. The lower phase of sonically treated products from either the subcavitation treatment or the cavitation treatment or both may be further separated to recover an intermediate emulsion phase and this emulsion phase may be recycled to the subcavitation treatment while the remaining water and solids phase is subjected to cavitation treatment. Alternatively, an intermediate emulsion phase from the first subcavitation treatment may be separated and subjected to a second subcavitation treatment prior to subjecting the bottoms product to the cavitation treatment. The water and solids from the process may be separated by filtering or centrifuging and, if desired, the solids material recovered may be washed with a solvent to remove any residual oil therefrom.

BACKGROUND OF THE INVENTION

In the refining and chemical industries, oil and chemicals are handled which are immiscible with water. As a result, serious problems of environmental pollution are eencountered in the disposal of waste materials from such plants. One major factor which makes this a difficult problem is that small amounts of solid materials are often contained in the waste products which have an oil or other water immiscible film formed about the solid particles and which are extremely difficult to remove by any presently known means. These oil-coated solids occur in waste waters from such manufacturing operations and their disposal and/or separation is further complicated by the fact that they are quite often mixed with recoverable quantities of oil and oil and water emulsions.

The primary example of this type of waste disposal problem is that which faces the oil refining industry, particularly integrated refineries producing motor fuels, burning oils, lubricating oils and greases, waxes, asphalts and specialty chemical products. In such operations, free and emulsified oil passes into the refinery sewer system from leaks, spills and tank draw-offs from practically each operation of the refinery, such as the crude oil storage facilities, cracking, polymerization, reforming, alkylation, and other catalytic processing facilities, product storage facilities, and chemical, solvent and solid adsorbent treating facilities. Sludges from tank bottoms also occure in most of these locations, as well as from heating boiler blow-down and treating operations. Anticorrosion additives, coke, waste catalysts, and like solids originate from the catalytic treating processes as well as distillation equipment and preheating equipment utilized throughout the refinery. Waste solid adsorbents, waste selective solvents, alkaline and acid sludges, waste waters and emulsions are also found in the sewer system and originate in the various chemical, solvent, and adsorbent treating operations of the refinery.

All of the above combined wastes or these wastes individually can generally be separated into a floating oil layer, a water layer, and a solids sediment by gravity differential, oil-water separators. The floating oil layer is generally skimmed from the top and is known in the industry as slop oil. While this slop oil amounts to a substantial volume of oil, it is unfit for return to processing units because of its solids water content. The water is generally present in the form of oil-in-water emulsions. These oil-in-water emulsions are extremely difficult to break with ordinary commercial demulsifying agents. The solids present in the slop oil are agglomerated oil and solids and solids covered with a coating of oil. While the solids, as such, may be removed from the water phase by vacuum filtration, etc., this still does not solve the problem of disposal since the oil film clings to the solids and will contaminate land and streams when it is disposed of as land fill or the like. This results from the fact that substantial solution with rain, etc., will cause the oil to be released and migrate to the surface. To date, no satisfactory solution has been presented for either the problem of breaking the oil-in-water emulsions or recovering or stripping the oil film from the solid material so that the oil can be utilized in the refinery process, the water can be utilized or disposed of in the conventional manner and the solids can be utilized or disposed of as land fill or other non-contaminating manner.

It is therefore an object of the present invention to provide an improved process for mitigating environmental pollution. Another and further object of the present invention is to provide an improved process for reducing water pollution. Yet another object of the present invention is to provide an improved process for disposing of refinery wastes without environmental pollution. A further object of the present invention is to provide an improved process for removing solids containing a film immiscible liquid from water. A still further object of the present invention is to provide an improved process for separating oil from oil-in-water emulsions. Another object of the present invention is to separate oil-in-water emulsions and oil-coated solids to obtain clarified oil, clarified water and oil-free solids. Yet another object of the present invention is to provide an improved process for the treatment of refinery slop oil to recover clarified oil and dispose of or use the water and solids without environmental pollution. These and other objects and advantages of the present invention will be apparent from the following description.

BRIEF DESCRIPTION OF THE INVENTION

In accordance with the present invention, solids coated with water-immiscible liquids are freed of the coating and separated from water containing the same subjecting the mixture to ultrasonic radiation at power levels sufficient to cause cavitation in the liquid. Oil-in-water emulsions are also resolved to separate clarified oil and water from such emulsions by subjecting the mixture to ultrasonic radiation at power levels insufficient to cause cavitation in the liquid.

BRIEF DESCRIPTION OF THE DRAWING

The single figure of the drawings shows a flow diagram of the method of the present invention.

DETAILED DESCRIPTION OF THE INVENTION

With reference to the drawing, the process of the present application will be described in conjunction with the treatment of a slop oil feed obtained from a petroleum refinery.

In accordance with the drawing, the slop oil is introduced through line 10 and thence line 12 to either line 14, 16 or 18, respectively. In the arrangement specifically shown, the feed lines are open on an alternating 72-hour cycle so that feed materials flow through each of lines 14, 16 and 18 for a 24-hour period. Feed from line 14 is introduced to treating and settling unit 20, feed from line 16 is fed to treating and settling unit 22, and feed from line 18 passes to treating and settling unit 24. Utilizing these three treating and settling units, during each 24-hour period, one unit is being filled, a second of the three units is being subjected to ultrasonic treatment and settling and the third unit is being emptied. The units are then cycled at the end of each 24-hour period so that the unit which was being treated and settled is emptied, the unit which was emptied is being filled and the unit which was being filled is ultrasonically treated and settled for the next 24-hour period. Power is supplied from an alternating current source 26 which supplies a 2 kw. generator 28. Power from generator 28 is cycled to each of units 20, 22 and 24 by means of switch 30. Power from switch 30 passes to ultrasonic vibrating units 32, 34 and 36, respectively, of treating units 20, 22 and 24. These units could also be distributors to individual spherical transducers. Transducer alternates are a cylinder, and a cylindrical or spherical array of vibrating rods, plates, disks, etc. During a given 8-hour treating period, ultrasonic treatment is carried out in alternating manner. For example, treatment is carried out for a period of preferably 5 to 30 minutes, followed by a 30 to 55 minute settling or stratification period. However, treating periods of 2 to 24 hours and total time cycles of 8 to 48 hours are feasible. The power level and volume of 20, 22 and 24 are selected to cause subcavitation treatment. Oil recovered as an upper phase in units 20, 22 and 24 is withdrawn through collection line 38 and is then passed to storage or back to the oil refinery through line 40. The remainder of the treated fluid comprising water and oil-coated solids material is withdrawn through collection line 42. From collection line 42, this fluid passes through line 44 to continuous ultrasonic treater 46. Power is obtained from an alternating current source 48 which operates a 20 kw. generator 50. Generator 50, in turn, operates vibrator unit 52. Vibrator unit 52 is shown as comprising 8 individual vibrating elements disposed on each side of an elongated trough-type continuous treater 46. However, there could also be two transducers (one on each side) with tuned lines to one or several vibrating plates. As shown, each vibrating element is a plate with 12 transducers. Each side could be one or more plates with one to 100 transducers. The dimensions of treater 46 and the fluid flow therethrough are such that vibrating unit 52 causes cavitation in the fluid flowing through treater 46. An oil phase from treater 46 is passed through one of lines 54 or 56 to settling tanks 58 and 60, respectively. Settling tanks 58 and 60 are alternately filled and settled and emptied. While one of tanks 58 and 60 is being filled, the other is settling and being emptied. In settling tanks 58 and 60, an upper oil layer is withdrawn through collection line 62, and passed back to the refinery through line 40. An emulsion layer may be withdrawn through collection line 64. From collection line 64, the emulsified material may be passed through either line 66 or line 68 to demulsifying and settling unit 70 or 72, respectively. The demulsifying and settling units 70 and 72 may be supplied with a demulsifying agent through lines 74 and 76, respectively. In demulsifying and settling units 70 and 72, another upper oil phase separates and this oil phase is withdrawn through collection line 78 and passed to line 40 and thence back to the refinery. Any remaining emulsion is withdrawn from demulsifying and settling units 70 and 72 through collection line 80. From collection line 80, the emulsion may be recycled through line 82 to line 44 for retreatment in continuous treater 46. At this point, however, the emulsion has been reduced in volume to such an extent that it may be withdrawn and disposed of without too serious a problem. Such withdrawal may be through line 84. A water and solids phase, substantially free of oil, is discharged from continuous treater 46 through line 86. The water and solids phase is passed from line 86 to vacuum filter 88. Numerous other filtering devices could be employed. A similar water phase containing solids and substantially free of oil is withdrawn from settling units 58 and 60 through collection line 90 from whence it is passed to filter 88. A water phase containing solids and substantially free of oil is also withdrawn from demulsifying-settling units 70 and 72 through collection line 92 and is thence passed to filter 88. If desired, demulsifying and settling units 70 and 72 may be eliminated and the emulsion layer from settling units 58 and 60 may be passed from collection line 64 through line 94 to continuous treater 46. Such recycling can be carried out essentially to extinction of the emulsion phase. Where the feed material comprises essentially water or other carrier fluid containing oil-coated solids or solids coated with other water-immiscible material, such feed material may be introduced through line 96 direct to continuous treater unit 46. Hence, if there is substantially no emulsion present, treating units 20, 22 and 24 may be bypassed. However, in most instances, an emulsion will be present and the preliminary emulsion breaking treatment is necessary. In some instances, it may also be highly desirable and economically advantageous to separate the slop oil feed by a preliminary settling operation without ultrasonic treatment. In such instances, the slop oil would be introduced through line 98 to preliminary settling tank 100. In preliminary settling tank 100, the feed would be separated into an upper oil phase which is withdrawn through line 102, passed to line 40 and thence back to the refinery. An intermediate or light emulsion phase may be withdrawn through line 104 and passed through lines 14, 16 or 18 to treating and settling units 20, 22 and 24, respectively. A heavy emulsion phase, containing the major portion of the solids, may be withdrawn through line 106 and thence passed through line 96 and line 44 to continuous treating unit 46. The remainder of the operation would be essentially as previously described.

In the preferred operation, the fluid, after treatment and settling in treating and settling units 20, 22 and 24, is withdrawn in three rather than two phases. Specifically, the oil phase or upper phase is withdrawn through collection line 38 as before. An intermediate or light emulsion phase is withdrawn through collection line 108. Instead of passing the light emulsion or intermediate phase to continuous treater 46, the light emulsion phase may be passed through either line 110 or line 112 to intermediate treating and settling units 114 and 116, respectively. A heavy emulsion phase, consisting essentially of water solids material, is then withdrawn from the bottom of treating and settling unit 20, 22 or 24 through collection line 42 and passed to continuous treater 46 through line 44. It is obvious that in this mode of operation, the load on continuous treater 46, which requires the greatest power consumption, is substantially reduced, thereby improving the economy of the system as well as improving separation and emulsion breaking. Treating and settling units 114 and 116 are supplied with power from generator 28 through switch 117. Generator 28 operates vibrating units 118 and 120 under conditions whereby the ultrasonic energy does not cause cavitation within the liquid in units 114 and 116. In other words, ultrasonic treatment is carried out at subcavitation levels. Also desirably, the level of sub-cavitation treatment in units 114 and 116 should be higher than the level of subcavitation treatment occurring in units 20, 22 and 24. This again contributes to the economy and efficiency of the operation. An oil phase is withdrawn from units 114 and 116 through collection line 122 and passed through line 40 back to the refinery. The remainder of the fluid from intermediate treating and settling units 114 and 116 is withdrawn through collection line 124 and passed through line 44 to continuous treater 46. When secondary treating and settling units 114 and 116 are utilized, an intermediate emulsion phase withdrawn from settling units 58 and 60 through line 126 may be passed through line 127 to line 130 from whence it is recycled through line 110 or line 112 to treating and settling unit 114 or 116. In this mode of operation, demulsifying units 70 and 72 can be eliminated and the emulsion from the settling units 58 and 60 recycled essentially to extinction. Similarly, when secondary treating and settling units 114 and 116 are utilized, an emulsion phase separated as an intermediate phase and withdrawn through collection line 128 from demulsifying and settling units 70 and 72 may be recycled through line 127 to line 130 and thence back to secondary treating units 114 and 116 through lines 110 or 112. This, again, provides an effective means of essentially eliminating residual emulsion. It is to be observed that recycle of the intermediate emulsion phases of units 58 and 60 and/or 70 and 72 may be recycled to units 20, 22 or 24.

As previously indicated, conventional demulsifying agents do a rather poor job in resolving the oil-in-water emulsions contemplated in the present invention. Hence, it is preferred that the emulsion be broken by ultrasonic treatment. Further, where the demulsifying and settling units 70 and 72 are used, as well as a recycle to treating units 114 and 116, the effective amount of demulsifying agent required may be substantially reduced.

The water and solids fed to filter 88 is separated to recover water therefrom which is discharged through line 132 for disposal or storage. The essentially clean solids from vacuum filter 88 are discharged through line 134. In some instances, it is desirable that the solids from filter 88 be further treated to remove residual traces of oil therefrom. This treatment can comprise a solvent washing treatment in solvent washing unit 136. In unit 136, the solids are contacted with an appropriate solvent introduced through line 138. Effluent solvent and oil is discharged through line 140. The effluent solvent and oil may be withdrawn through line 142 and returned to the refinery for separation and recovery of the oil. Alternatively, the solvent and oil may be passed through line 144 for recycle to solvent washing unit 136 until the solvent is essentially saturated. Washed solids are discharged from solids washing unit 136 through line 146. If an appropriate normally gaseous solvent, such as liquified, normally gaseous propane or the like, is utilized in the solvent washing step, any residual solvent carried over in the solids discharged through line 146 will flash of its own accord, thereby eliminating the necessity of any additional drying or flashing operation. However, it is contemplated that the solids may be treated to dry and/or remove residual oil or solvent therefrom. It is also possible to remove water from the water-solids phase by applying pressure rather than vacuum filtration.

Assuming a slop oil feed rate of about 300 barrels per day passing through the system decribed above, treating and settling tanks 20, 22 and 24 would have capacities of 500 barrels each. These tanks preferably would be cone-bottomed tanks with a coal tar epoxy interior coating. Two larger treating tanks could also be used on 36-hour cycles. The secondary treating tanks 112 and 114 would be similar except that their capacity would be approximately 100 barrels each. Settling tanks 58 and 60 and demulsifying and settling tanks 70 and 72 would also have capacities of approximately 100 barrels each.

Also by way of example, if a conventional slop oil collected from an entire refinery at a flow rate of about 300 barrels per day were treated, approximately 160 to 180 barrels of clean oil per day could be recovered for recycle to the refinery. The recovered water would be about 100 to 120 barrels per day and approximately 20 barrels per day of solids would be collected. In this particular operation, the feed oil recovered from primary treating units 20, 22 and 24 is equal to approximately 100 barrels per day. The intermediate or light emulsion treated in units 114 and 116 is equal to approximately 170 barrels per day and the heavy emulsion subjected to cavitation treatment in the continuous treater 46 is approximately 30 barrels per day. Hence, the flow rate through treater 46 would be approximately 30 barrels per day.

In addition to the numerous variations and modifications specifically recited above, it should also be obvious that any one of the steps of the present technique may be aided by heating the various materials, particularly to aid demulsification. In like manner, various chemical treating agents may be used as an aid to any of the specific operations. For example, a demulsifying agent could be added to settling tanks 58 and 60. Likewise, a demulsifying agent may be used as an aid in any of the ultrasonic treating units. Diluents or appropriate solvents may also be employed at any stage in the operation where separation or handling will be aided by their presence. However, if such diluents or solvents are utilized, they should be utilized after ultrasonic treatment since it is highly desirable with the volume of liquid treated in any of the ultrasonic units, and particularly the cavitation unit 46, be kept to a minimum. Other such variations and modifications will, of course, be obvious to one skilled in the art.

As previously indicated, any aqueous fluid containing solids coated with a water-immiscible compound, such as oil, may be clarified by subjecting it to an ultrasonic cavitation treatment in accordance with the present invention. However, as was also previously indicated, in most instances where water contains oil-coated solids or the like, the fluid will also contain either water-in-oil or oil-in-water emulsions, generally the latter. Consequently, such fluids must be subjected to a first ultrasonic subcavitation treatment and thereafter to an ultrasonic subcavitation treatment and thereafter to an ultrasonic cavitation treatment. It has been found in accordance with the present invention that if waste materials containing an emulsion are subjected to an ultrasonic cavitation treatment, such treatment will result in making the emulsion more difficult to break rather than breaking it. Actually, when such a mixture, particularly one containing an oil-in-water emulsion, is subjected to ultrasonic cavitation treatment, the fluid is gelled or made substantially more viscose than it was originally. This, of course, makes any efforts to thereafter separate the materials extremely difficult.

As previously indicated, the present invention can be utilized in the separation of solids coated with an oil or other water-immiscible film from a liquid material including water, water and oil, oil and water emulsions, etc. The invention is particularly useful where the liquid contains both an oil-in-water emulsion and solids coated with an oil film. Materials of this character originate in numerous petroleum refining and chemical production industries. In many cases, such materials are waste materials from such operations which must be disposed of, but which cannot be disposed of as such without environmental pollution. A particular source of such waste materials is a petroleum refinery, whether the waste materials be in the form of an accumulation of waste oils from all refinery operations, or a waste material from an individual operation. In any event, in the treatment of petroleum refinery wastes, the present invention permits the recovery and utilization of the oil present in the waste, the clarification of the water contained in the waste so that it may be used or disposed of without environmental contamination and the recovery of the solids free of oil so that such solids may be utilized or disposed of without environmental contamination.

As previously pointed out, in the description of the drawing, a 2 kw. generator will adequately treat a 500 barrel tank of fluid in the subcavitation treatment of the fluid. This may be expressed differently in that a slop oil from refinery processing can be subcavitated using an energy level between about 2 and 10 watts or 0.002 to 0.040 kilowatt hours per barrel of slop oil. It is also stated in the description of the drawing that a 20 kw. generator could adequately treat 30 barrels per day of material, flowing through a continuous ultrasonic treater, at cavitation levels. This can also be expressed in terms of number of barrels treated. Specifically, the cavitation treatment will require about 1 to 10 kwh. per barrel of fluid treated. The frequency of treatment is not particularly critical but is preferably in the ultrasonic range. A suitable frequency may be between about 10 and 400 kHz. Preferably, the frequency should be between about 10 and 200 kHz. since frequencies above 200 kHz. require too high a power consumption to cause cavitation.

While it has been found that conventional demulsifying agents are ineffective in treating the original emulsions, this is due to a large extent to the fact that the emulsion mixture, particularly waste mixtures, contains solids having a film of oil there about. Once the solids are cleaned and/or removed, the emulsions are more amenable to conventional treatments. In any event, the residual emulsions treated from demulsifying-settling units 70 and 72 can be subjected to further demulsification by heat or conventional demulsifying agents. Suitable demulsifying agents which may be employed include organic acids, such as acetic acid, propionic acid, etc., metal chlorides, such as aluminum chloride, ferric chloride, etc., polymeric ether materials, such as polyoxyethylene thioether, linear polymers of methyl vinyl ether, etc., quaternary ammonium compounds, such as lauryl pyridinium chlorides, lauryl pyridinium sulfates, etc., amine compounds, such as ethylene oxide derivatives of dehydroabietyl amine, long chain fatty acid derivatives of imidazoline etc. In some instances, depending upon the nature of the material being treated, it may also be desirable to add small amounts of such demulsifying agents or to apply heat in the preliminary settling unit 100 or in any of the treating and settling units 20, 22, 24, 114 and 116. Demulsifying agents might also be added in settling units 58 and 60.

Since the solids recovered by filtration have extremely low oil contents, solvent washing may or may not be necessary. In any event, where solvent washing is practiced a wide variety of known oil solvents may be employed. For example, normal paraffins, either normally gaseous or normally liquid may be employed, solvent naphthas, aromatic solvents or any conventional solvent liquid may be employed solvent material having a high affinity for oil. However, such solvent should be readily separable from the oil. As is the case with demulsification, solvents of this character are more effective after the emulsion has been separated from the oil-coated solids.

The following examples illustrate the practice of the present invention as applied to slop oil mixtures from an integrated petroleum refinery. The subject slop oil is a collection of all waste oil materials from such a refinery.

EXAMPLE I

The following table lists the properties of the slop oil treated in accordance with this example.

| | |
|---|---|
| Gravity, °API (oil only) | 29.9 |
| ASTM distillation, °F.: | |
| IBP | 278 |
| 5% | 330 |
| 10% | 372 |
| 20% | 448 |
| 30% | 505 |
| 40% | 540 |
| 50% | 572 |
| 60% | 606 |
| 70% | 650 |
| 78% | 700 |
| S.S.U. viscosity at: | |
| 100° F. | 45.1 |
| 140° F. | 37.7 |
| 210° F. | 32.3 |
| Water by distillation, percent vol. | 47 |

Upon preliminary settling, the slop oil settled into three essentially distinct layers. A top layer consisting of about 33% of free oil, a middle layer consisting of about 56% of fine, light brown emulsion, and a bottom layer consisting of about 11% of a coarse, dark, brown, heavy emulsion with a high solids content.

Centrifuge analyses of each of the different phases was carried out throughout the operation including analysis of the initial separated phases. Such centrifuge analysis was carried out by taking a 50 ml. sample of the material, adding 50 ml. of xylol, mixing with vigorous shaking and subjecting the mixture to centrifuging at 1500 r.p.m. until stable readings of the contents were obtained. Several such tests were averaged to obtain the final contents.

The middle or light emulsion comprised 46% oil, 7% of an emulsion interface, 36% water and 11% sediment solids. The heavy emulsion phase comprised 29% oil, 49% water and 22% sediment solids. The light emulsion phase was then subjected to ultrasonic treatment at subcavitation power levels, (approximately 2 watts of generator output) for 30 minutes at a frequency of 50 kHz. Following the 30-minute sonification, a 30-minute settling period was permitted. During the settling period, the sample separated into two phases; namely, an upper phase comprising free oil amounting to about 40% by volume and a lower phase amounting to about 60% by volume of oil water and sediment. By contrast, sonification of this same light emulsion at cavitation power levels produced a very fine tan emulsion which was much more stable than the initial emulsion treated. The subcavitated material was also analyzed and it was found that the upper phase comprised 98.8% oil with 1.2% BS & W, while the lower phase comprised 20% oil, 16% emulsion interface, 43.2% water and 10.8% sediment solids.

The heavy emulsion phase was subjected to ultrasonic treatment in a unit with a generator output of 35 watts for 20 minutes and at a frequency of 50 kHz. During this treatment, cavitation occurred within the emulsion. Separation into two phases, including 40% bottom water phase and 60% upper fine emulsion, progressed during the sonification. After 15 minutes settling, little change in the two phases occured. However, after 1 hour of settling a film of oil began to develop on top of the fine emulsion phase. By contrast, sonification of the heavy emulsion phase at subcavitation levels had an extremely slow demulsifying effect. After 5 hours of undisturbed settling, the cavitated heavy emusion separated into layers comprising oil, a secondary emulsion, water and water-wet sediment. The upper phase of the sonified heavy emulsion was found to contain 7.2% sediment solids, 14.8% of an interface phase comprising a combination of floating solids and secondary emulsion and 40% of oil. The lower phase of the sonified heavy emulsion (including the water and water-wet sediment) comprised 0.8% oil, 19.6% floating solids, 79.2% water and 0.4% sediment solids.

From the above, it is quite obvious that a slop oil of the type referred to above can be treated in accordance with the present invention by subcavitation of the emulsion and cavitation treatment of material containing predominantly solids covered with oil; to produce a clean sediment which can be utilized or disposed of without environmental contamination, a water phase which can be used or disposed of without environmental contamination and a reclaimed oil which comes within acceptable limits for a refinery charge stock.

EXAMPLE II

A 55 gallon drum of slop oil from the same integrated refinery, as in the previous example, was found to have the following characteristics.

| | |
|---|---|
| Gravity, °API (oil only | 28.8 |
| ASTM distillation, °F.: | |
| IBP | 294 |
| 10% | 382 |
| 20% | 455 |
| 30% | 502 |
| 40% | 534 |
| 50% | 566 |
| 60% | 600 |
| 70% | 646 |
| 80% | 700 |
| S.S.U. viscosity at 100° F. | 44.3 |
| S.S.U. viscosity at 210° F. | 32.5 |
| Water by distillation, percent | 39 |
| BS & W, percent | 46 |

All stages were analyzed by centrifuge analysis. Specifically, 10 ml. of fluid was shaken with 50 to 75 ml. of precipitation naphtha. Centrifuging at 2000 r.p.m. was carried out until stable readings were obtained.

Preliminary settling of this slop oil resulted in separation into 49.2% of a free oil phase, and 50.8% of a lower emulsion phase. A sample of the oil phase was taken slightly below the center of the free oil layer, a sample of light emulsion was taken about 6 inches below the free oil-emulsion interface and a sample of heavy emulsion was taken about 4 inches from the bottom of the drum. Analysis of each of these three samples showed the free oil phase contained approximately 97.7% oil and 2.3% BS & W; the middle or light emulsion phase contained 17.5% oil, 18.0% of an interface emulsion, 51.0% water and 13.5% solids; the heavy emulsion or bottom portion comprised 10% oil, 5% of an interface emulsion, 15% water and 70% solids.

The upper free oil phase was subjected to ultrasonic treatment at subcavitation levels. The sonified material was settled for a total treating and settling time of less than 1 hour. A sample from the top was analyzed and found to contain 99.0% oil and 1.0 BS & W, and a sample from the bottom contained 97.4% oil and 2.6% BS & W.

The light emulsion was also subjected to ultrasonic treatment at subcavitation levels and settled for a total treating period less than about 1 hour. A sample from the top of the product showed 50% oil, a 42% emulsion interface, 6% water and 2% solids. A sample from the bottom of the product showed 10% interface, 85% water and 5% solids.

Finally, the heavy emulsion was subjected to ultrasonic treatment at cavitation power levels and settling for a period of less than about 1 hour. A sample from the top of the cavitated material showed 32% oil, 28% interface, 29% water and 11% solids. A sample from the bottom of the product showed 15% interface emulsion, 82.5% water and 2.5% solids.

This slop oil material was then mixed to produce a uniform emulsion. The uniform emulsion was then subjected to ultrasonic treatment at subcavitation levels. A sample taken from the top of the settled product showed 99.3% oil and 0.7% BS & W. A sample from the bottom of the product showed 50% oil, 7% interface, 28% water and 15% solids. Obviously, the upper phase of the subcavitated uniform emulsion was well within specifications for oil for use within the refinery. It is also quite obvious that subjection of the bottom material to cavitation treatment in accordance with the present invention will readily produce additional refinery specification oil, a clarified water and clean solids.

While a specific slop oil has been treated in the examples, it should be recognized that slop oils vary considerably in composition and physical properties and that this process lends itself to variation of design to meet these variations in slop oils. For example, the flow rates, power of treatment levels, treatment and retention times, etc. may be varied to meet the requirements for a specific slop oil. It is also to be recognized that the method is applicable to other disposal problems, such as factory sludges, sewages, etc.

What is claimed is:

1. A method for separating a water-immiscible liquid, water and solids from a feed material containing a water-immiscible liquid and water emulsion and solids, comprising; subjecting at least a portion of said feed material to ultra sonic treatment at subcavitation power levels; separating the subcavitated product into an upper water-immiscible phase and a lower water and solids phase; subjecting at least a portion of said lower water and solids phase of said subcavitated product to ultrasonic treatment at cavitation power levels; and separating the cavitated product into an upper water-immiscible phase and a lower water and solids phase.

2. A method in accordance with claim 1 wherein the water-immiscible liquid is oil.

3. A method in accordance with claim 1 wherein the water-immiscible liquid and water emulsion is an oil-in-water emulsion.

4. A method in accordance with claim 1 wherein the feed material is a petroleum refinery waste material.

5. A method in accordance with claim 4 wherein the refinery waste material is slop oil.

6. A method in accordance with claim 1 wherein the feed material is subjected to a preliminary settling step; the product of the preliminary settling step is separated into an upper water-immiscible phase and a lower water and solids phase; and said lower water and solids phase of said preliminary settling step is fed to the ultrasonic treatment at subcavitation power levels.

7. A method in accordance with claim 6 wherein the lower water and solids phase of the preliminary settling step is further separated into an upper, intermediate emulsion phase and a lower residual water and solids phase; said intermediate emulsion phase is fed to the ultrasonic treatment at subcavitation power levels and said residual water and solids phase from said further separation step is fed to the ultrasonic treatment at cavitation power levels.

8. A method is accordance with claim 1 wherein the lower water and solids phase of the subcavitation treatment is further separated into an upper, intermediate emulsion phase and a lower residual water and solids phase; and said intermediate emulsion phase is subjected to a second ultrasonic treatment at subcavitation power levels; the product of said second subcavitation treatment is separated into an upper water-immiscible phase and a lower water and solids phase; and said lower water and solids phase of said subcavitation treatment is subjected to the ultrasonic treatment at cavitation power levels.

9. A method in accordance with claim 1 wherein the ultrasonic treatment at subcavitation power levels is a batch-type treatment.

10. A method in accordance with claim 1 wherein the ultrasonic treatment at cavitation power levels is a continuous treatment.

11. A method in accordance with claim 1 wherein the water and solids of the lower water and solids phase of the cavitation treatment are separated by filtering.

12. A method in accordance with claim 11 wherein the filtered solids are washed with a solvent.

13. A method in accordance with claim 1 wherein the upper water-immiscible phase of the cavitation treatment is further separated into an upper water-immiscible phase and a lower water and solids phase.

14. A method in accordance with claim 13 wherein the lower water and solids phase of the further separation of the water-immiscible phase of the cavitation treatment is subjected to demulsification and the demulsified product is separated into an upper water-immiscible phase and a lower water and solids phase.

15. A method in accordance with claim 14 wherein the lower water and solids phase of the demulsification treatment is recycled to the cavitation treatment.

16. A method in accordance with claim 14 wherein the lower water and solids phase from the demulsification treatment is further separated into an upper, intermediate emulsion phase and a lower residual water and solids phase; and the intermediate emulsion phase is recycled to the subcavitation treatment.

17. A method in accordance with claim 16 wherein the residual water and solids phase of the further separation of the demulsification treatment is recycled to the cavitation treatment.

18. A method in accordance with claim 13 wherein the lower water and solids phase of the further separation of the upper water-immiscible phase of the cavitation treatment is still further separated into an upper, intermediate emulsion phase and a lower residual water and solids phase.

19. A method in accordance with claim 18 wherein the intermediate emulsion phase is recycled to the subcavitation treatment.

20. A method in accordance with claim 18 wherein the intermediate emulsion phase is subjected to demulsification and the demulsified product is separated into an upper water-immiscible phase and a lower water and solids phase.

21. A method in accordance with claim 18 wherein the residual water and solids phase is recycled to the cavitation treatment.

22. A method for breaking an oil-in-water emulsion, comprising; subjecting said emulsion to ultrasonic treatment at subcavitation power levels, and separating an upper oil phase from a lower water phase.

23. A method in accordance with claim 22 wherein the lower water phase is further separated into an upper intermediate emulsion phase and a lower water phase and said intermediate emulsion phase is recycled to the ultrasonic treatment.

24. A method of removing solids from an aqueous medium containing said solids coated with a water-immiscible film, comprising; subjecting said aqueous medium to ultrasonic treatment at cavitation power levels and separating an upper water-immiscible phase from a lower solids-containing phase.

25. A method in accordance with claim 24 wherein the water-immiscible film is oil.

26. A method in accordance with claim 24 wherein the lower solids-containing phase is further separated into an aqueous medium phase and liquid-free solids.

27. A method in accordance with claim 26 wherein the separation is effected by filtering.

28. A method in accordance with claim 27 wherein the filtered solids are washed with a solvent.

References Cited

UNITED STATES PATENTS

| | | | |
|---|---|---|---|
| 2,082,847 | 6/1937 | Petty | 210—197X |
| 2,391,494 | 12/1945 | Walker | 210—195X |
| 2,730,190 | 1/1956 | Brown et al. | 210—259X |
| 3,017,342 | 1/1962 | Bulat et al. | 210—19X |
| 3,200,567 | 8/1965 | May | 210—73X |

SAMIH N. ZAHARNA, Primary Examiner

U.S. Cl. X.R.

210—73, 83 oil-water digest; 208—187